United States Patent
Kamioka et al.

(10) Patent No.: US 9,827,979 B2
(45) Date of Patent: Nov. 28, 2017

(54) TRANSMISSION CONTROL DEVICE AND TRANSMISSION CONTROL METHOD

(71) Applicant: Mitsubishi Electric Corporation, Tokyo (JP)

(72) Inventors: Nozomu Kamioka, Tokyo (JP); Satoshi Wachi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 29 days.

(21) Appl. No.: 14/768,480

(22) PCT Filed: Apr. 24, 2013

(86) PCT No.: PCT/JP2013/062041
§ 371 (c)(1),
(2) Date: Aug. 18, 2015

(87) PCT Pub. No.: WO2014/174605
PCT Pub. Date: Oct. 30, 2014

(65) Prior Publication Data
US 2016/0001769 A1    Jan. 7, 2016

(51) Int. Cl.
*B60W 10/06* (2006.01)
*B60W 10/08* (2006.01)
(Continued)

(52) U.S. Cl.
CPC ............ *B60W 20/30* (2013.01); *B60K 6/485* (2013.01); *B60K 6/543* (2013.01); *B60W 10/06* (2013.01);
(Continued)

(58) Field of Classification Search
CPC .............................. B60W 20/30; B60W 20/40
See application file for complete search history.

(56) References Cited

U.S. PATENT DOCUMENTS

| 5,722,911 A | 3/1998 | Ibaraki et al. |
| 8,118,703 B2 * | 2/2012 | Puiu ................ B60K 6/387 180/65.7 |

(Continued)

FOREIGN PATENT DOCUMENTS

| JP | 09-037410 A | 2/1997 |
| JP | 2001-146121 A | 5/2001 |

(Continued)

OTHER PUBLICATIONS

International Search Report of PCT/JP2013/062041 dated May 21, 2013.

*Primary Examiner* — Redhwan K Mawari
*Assistant Examiner* — Anshul Sood
(74) *Attorney, Agent, or Firm* — Sughrue Mion, PLLC; Richard C. Turner

(57) ABSTRACT

A transmission control device (4) includes: a gear ratio calculating unit (4a) for calculating a target gear ratio of a transmission (2) based on a gear ratio control mode, to thereby control the transmission; an electric motor drive torque calculating unit (4b) for calculating a drive torque of an electric motor (9) based on the gear ratio control mode when drive of the electric motor (9) is permitted; and an engine torque calculating unit (4c) for calculating an output torque of an engine (1) based on the gear ratio control mode so as to achieve a best fuel efficiency operation state. The gear ratio calculating unit (4a) switches processing of calculating a gear ratio based on whether or not the drive of the electric motor (9) is permitted.

12 Claims, 9 Drawing Sheets

(51) Int. Cl.
  *B60W 20/00* (2016.01)
  *B60W 20/30* (2016.01)
  *B60K 6/543* (2007.10)
  *B60K 6/485* (2007.10)
  *B60W 10/107* (2012.01)
  *B60W 20/40* (2016.01)
  *B60W 20/13* (2016.01)
  *B60W 20/11* (2016.01)

(52) U.S. Cl.
  CPC .......... *B60W 10/08* (2013.01); *B60W 10/107* (2013.01); *B60W 20/11* (2016.01); *B60W 20/13* (2016.01); *B60W 20/40* (2013.01); B60W 2510/087 (2013.01); B60W 2510/1005 (2013.01); B60W 2510/244 (2013.01); B60W 2540/10 (2013.01); B60W 2710/0627 (2013.01); B60W 2710/0633 (2013.01); B60W 2710/0644 (2013.01); B60W 2710/0666 (2013.01); B60W 2710/081 (2013.01); B60W 2710/083 (2013.01); B60W 2710/1005 (2013.01); *B60W 2710/105* (2013.01); *B60W 2710/1038* (2013.01); *Y02T 10/6226* (2013.01); *Y10S 903/93* (2013.01)

(56) References Cited

U.S. PATENT DOCUMENTS

| | | | |
|---|---|---|---|
| 8,965,614 B2* | 2/2015 | Nissato | B60K 6/442 180/65.1 |
| 2011/0087390 A1* | 4/2011 | Pandit | B60K 1/00 701/22 |
| 2012/0006153 A1* | 1/2012 | Imamura | B60K 6/442 74/665 A |
| 2014/0004994 A1* | 1/2014 | Wang | B60K 6/445 477/4 |

FOREIGN PATENT DOCUMENTS

| | | |
|---|---|---|
| JP | 2004-019641 A | 1/2004 |
| JP | 2006-138219 A | 6/2006 |
| JP | 3797284 B2 | 7/2006 |

* cited by examiner

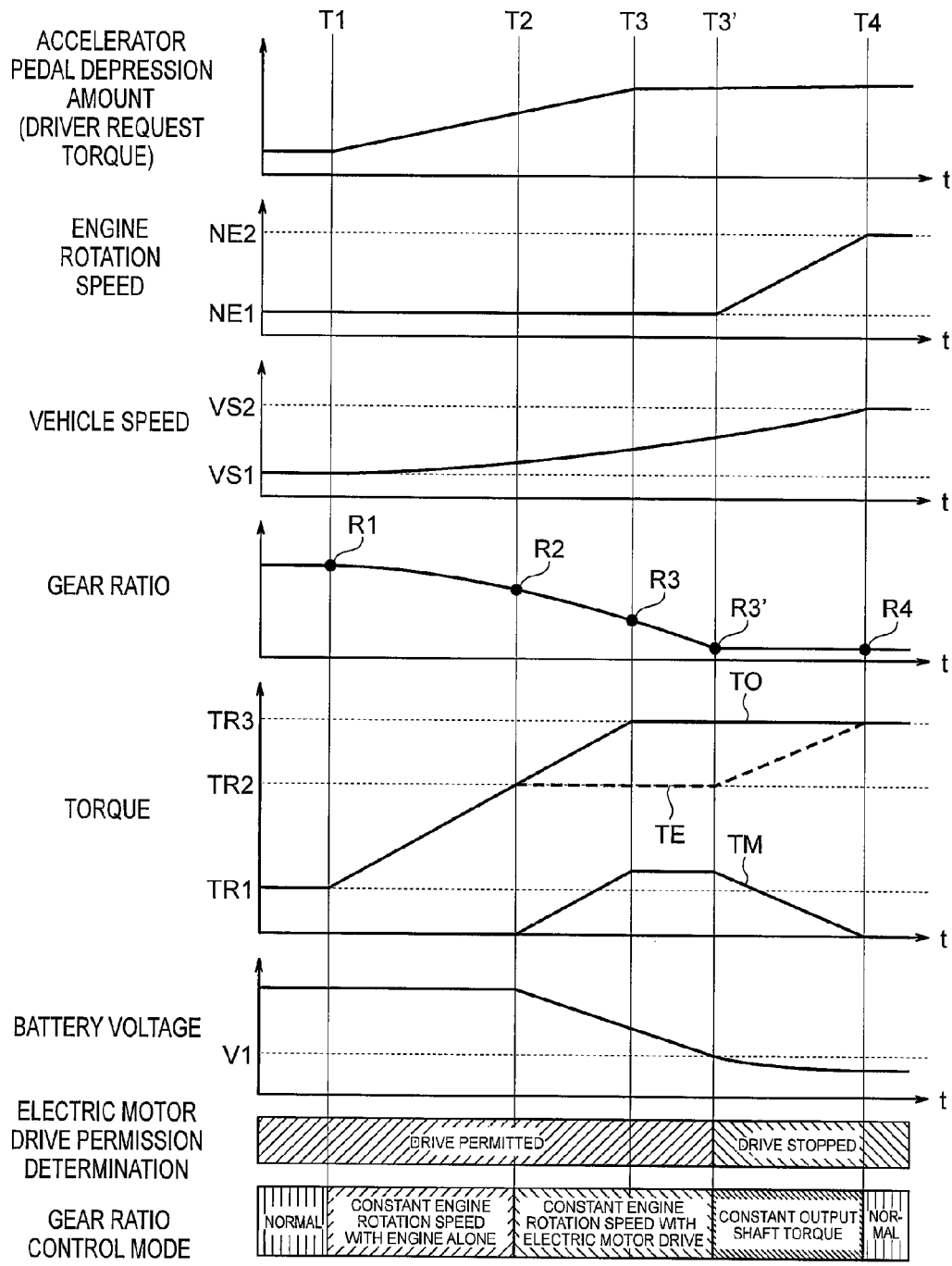

TRANSMISSION CONTROL DEVICE AND TRANSMISSION CONTROL METHOD

CROSS REFERENCE TO RELATED APPLICATIONS

This is a National Stage of International Application No. PCT/JP2013/062041 filed Apr. 24, 2013, the contents of which are incorporated herein by reference in its entirety.

TECHNICAL FIELD

The present invention relates to a transmission control device and a transmission control method, and more particularly, to a transmission control device and a transmission control method to be used in a vehicle including an engine and an electric motor as power sources.

BACKGROUND ART

With the problem of global greenhouse gas as a background, there has been need for development in technology of reducing fuel consumption in an automobile. For example, there has been developed a technology of reducing fuel consumption of a vehicle by recovering kinetic energy generated during deceleration as electric power to reduce the amount of electric power to be generated during a period other than deceleration, or by converting, by means of an electric motor, electric power energy recovered in a low engine efficiency region into a driving force to assist an engine. In such a vehicle, when a driver requests acceleration, in order to realize a necessary torque, there are methods such as (1) increasing the torque of the engine, (2) increasing the torque of the electric motor, and (3) changing the gear ratio. However, there are several conceivable combinations of the magnitude of the torque and the gear ratio to be output to the engine and the electric motor. Therefore, it has been difficult to output such command value to the engine and the electric motor that the fuel consumption is minimized.

When a vehicle includes an electric storage device with a large electric storage capacity, the electric motor can be driven for a long period of time with the plenty of stored energy. Therefore, the electric motor can assist the engine at an arbitrary timing. However, as the electric storage capacity is increased, the volume of the electric storage device is also increased, which decreases the living space of the vehicle and also increases the weight of the vehicle. As a result, the fuel efficiency is decreased. Further, as the electric storage capacity is increased, there is a disadvantage in that the cost is also increased. Therefore, in the case where an electric storage device with a relatively small electric storage is used and the assistance is limited to a region in which the electric motor efficiency is high, a high assistance effect can be obtained.

In the case of a general electric motor, the electric motor is operated with higher efficiency when a semiconductor element called an inverter is used for switching than when a commutator is used for switching. Further, the maximum output torque of the electric motor tends to be larger as a rotation speed thereof is lower, and the maximum output torque thereof tends to be smaller as the rotation speed thereof is higher. Moreover, when the rotation speed of the electric motor is increased, the number of times of switching is also increased. Therefore, the loss during switching is increased, which decreases the efficiency. In view of the above, it can be said that, in order to enhance the assistance effect by the electric motor, it is desired that the assistance be limited to a region in which the rotation speed is low.

General fuel consumption rate characteristics of the engine are shown in FIG. 1. In FIG. 1, the lateral axis represents the rotation speed of the engine, and the vertical axis represents an engine torque. In FIG. 1, fuel consumption per unit work amount is shown, and concentric characteristics are shown with a peak at a predetermined torque and a predetermined rotation speed. The curve A in FIG. 1 represents a best fuel efficiency drive torque curve, which is obtained by connecting a point with minimum fuel consumption rate at each rotation speed of the engine. When the engine is controlled to be operated on this best fuel efficiency drive torque curve, the fuel consumption can be reduced. In view of the above, it is understood that the following operation is desired in order to maximally reduce the fuel consumption: The engine is operated on the best fuel efficiency drive torque curve; When the driver requests a torque larger than the best fuel efficiency drive torque curve, the operation state is held without changing the rotation speed of the engine, and the difference between the best fuel efficiency drive torque and the driver request is assisted by the torque of the electric motor.

However, when the output of the engine or the output of the electric motor is increased in response to the acceleration request of the driver, the rotation speed of the engine is also increased along with the increase of those outputs. As a result, there has been a problem in that the fuel consumption is increased.

For example, in the control device disclosed in Patent Literature 1, the gear ratio is set so as to cover the deviation between the driver request torque and the best fuel efficiency drive torque by using the power generation/driving operation of the generator motor.

Further, for example, in the control device disclosed in Patent Literature 2, the priority sequence in a control of adjusting the driving force with respect to a vehicle driving force request is set in the sequence of an engine output increase, a motor output increase, and a gear speed change in a gear ratio increasing direction.

CITATION LIST

Patent Literature

[PTL 1] JP 3797284 B2
[PTL 2] JP 2001-146121 A

SUMMARY OF INVENTION

Technical Problem

In the related-art control device disclosed in Patent Literature 1, the gear ratio is calculated so as to move on the best fuel efficiency drive torque curve, and hence the vehicle speed is also increased along with the increase in the output of the engine or the generator motor. The rotation speed is also increased in accordance with the vehicle speed, and hence there has been a problem in that, even when the operation state of the engine during control is on the best fuel efficiency drive torque curve, the fuel consumption may be increased.

In the related-art control device disclosed in Patent Literature 2, when the engine output is increased while the engine is operated on the best fuel efficiency drive torque curve, the engine is driven outside of the best fuel efficiency drive torque. Therefore, there has been a problem in that the fuel consumption is increased.

The present invention has been made to solve the above-mentioned problems, and has an object to obtain a transmission control device and a transmission control method in which, in a vehicle including an engine and an electric motor as power sources, when an acceleration request is issued by a driver, the electric motor is driven in such a manner that the engine state can be maintained in a best fuel efficiency state, and a transmission is controlled to have an optimum gear ratio, to thereby minimize the fuel consumption.

Solution to Problem

According to one embodiment of the present invention, there is provided a transmission control device to be mounted on a vehicle, for controlling a transmission, the vehicle including: an engine for causing the vehicle to run by transmitting power obtained through fuel combustion to a wheel of the vehicle; a power transmission path for mutually transmitting the power of the engine and power of the wheel; an electric motor for applying a torque to the power transmission path by electric power of an electric storage device; the transmission disposed in the power transmission path, for changing a rotation speed of the engine and a rotation speed of the electric motor; an engine control device for controlling an output of the engine by adjusting an intake air amount and a fuel injection amount to the engine; and a driver request torque calculating device for calculating a driver request torque based on a depression amount of an accelerator pedal, the transmission control device having a plurality of gear ratio control modes, the transmission control device being configured to change a gear ratio control mode depending on a state of the vehicle, and determine that, based on a drive permission determining condition for the electric motor, drive of the electric motor is permitted when the drive permission determining condition is satisfied and the drive of the electric motor is prohibited when the drive permission determining condition is unsatisfied, the transmission control device including: a gear ratio calculating unit for calculating a target gear ratio of the transmission based on a current gear ratio control mode, to thereby control the transmission to be set to the target gear ratio; an electric motor drive torque calculating unit for calculating a drive torque of the electric motor based on the current gear ratio control mode when it is determined that the drive of the electric motor is permitted; and an engine torque calculating unit for calculating an output torque of the engine based on the current gear ratio control mode so as to achieve a best fuel efficiency operation state with minimum fuel consumption per unit work amount of the engine, the gear ratio calculating unit being configured to switch processing of calculating the gear ratio based on whether or not the drive of the electric motor is permitted.

Advantageous Effects of Invention

According to the one embodiment of the present invention, there is provided the transmission control device to be mounted on a vehicle, for controlling a transmission, the vehicle including: the engine for causing the vehicle to run by transmitting the power obtained through fuel combustion to the wheel of the vehicle; the power transmission path for mutually transmitting the power of the engine and power of the wheel; the electric motor for applying the torque to the power transmission path by electric power of the electric storage device; the transmission disposed in the power transmission path, for changing the rotation speed of the engine and the rotation speed of the electric motor; the engine control device for controlling the output of the engine by adjusting the intake air amount and the fuel injection amount to the engine; and the driver request torque calculating device for calculating the driver request torque based on the depression amount of the accelerator pedal, the transmission control device having the plurality of gear ratio control modes, the transmission control device being configured to change the gear ratio control mode depending on a state of the vehicle, and determine that, based on the drive permission determining condition for the electric motor, drive of the electric motor is permitted when the drive permission determining condition is satisfied and the drive of the electric motor is prohibited when the drive permission determining condition is unsatisfied, the transmission control device including: the gear ratio calculating unit for calculating the target gear ratio of the transmission based on the current gear ratio control mode, to thereby control the transmission to be set to the target gear ratio; the electric motor drive torque calculating unit for calculating the drive torque of the electric motor based on the current gear ratio control mode when it is determined that the drive of the electric motor is permitted; and the engine torque calculating unit for calculating the output torque of the engine based on the current gear ratio control mode so as to achieve the best fuel efficiency operation state with minimum fuel consumption per unit work amount of the engine, the gear ratio calculating unit being configured to switch processing of calculating the gear ratio based on whether or not the drive of the electric motor is permitted. Therefore, in a vehicle including an engine and an electric motor as power sources, when an acceleration request is issued by a driver, the electric motor may be driven in such a manner that the engine state can be maintained in the best fuel efficiency state, and the transmission is controlled to an optimum gear ratio, to thereby minimize the fuel consumption.

BRIEF DESCRIPTION OF DRAWINGS

FIG. 5 is a time chart when an electric motor is driven in the transmission control device according to the first embodiment of the present invention.

DESCRIPTION OF EMBODIMENTS

First Embodiment

Figure 1:
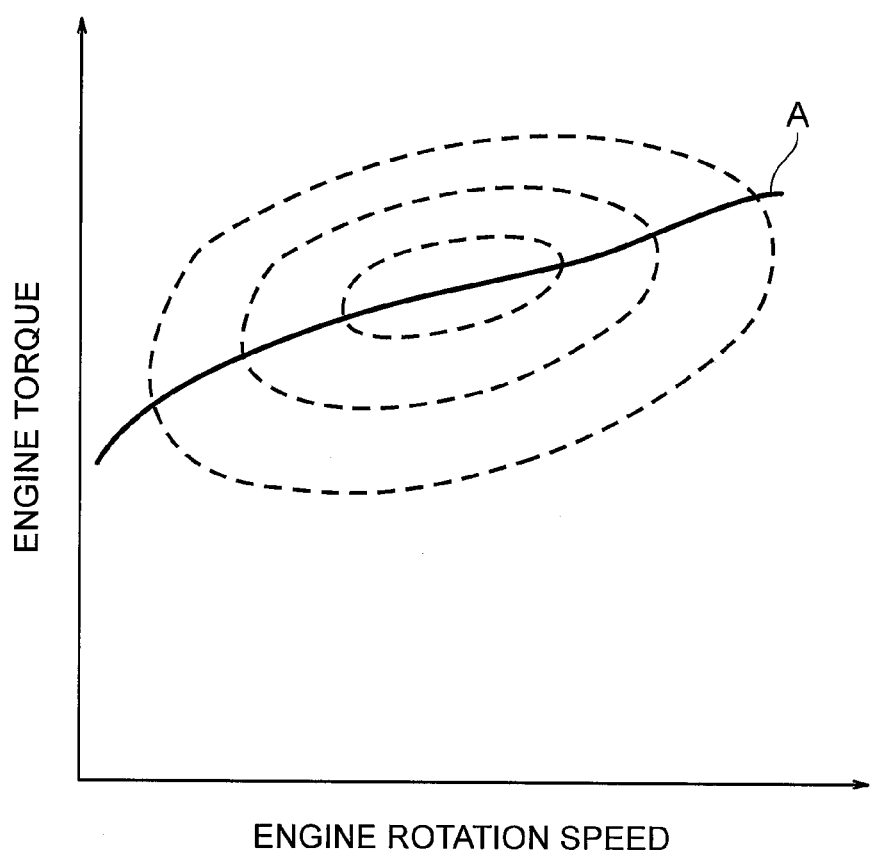
FIG. 1 is a graph for showing general fuel consumption rate characteristics of an engine.

Now, a transmission control device according to a first embodiment of the present invention is described with reference to FIG. 2 to FIG. 8. The same reference numeral used throughout FIG. 2 to FIG. 8 represents the same component.

Figure 2:
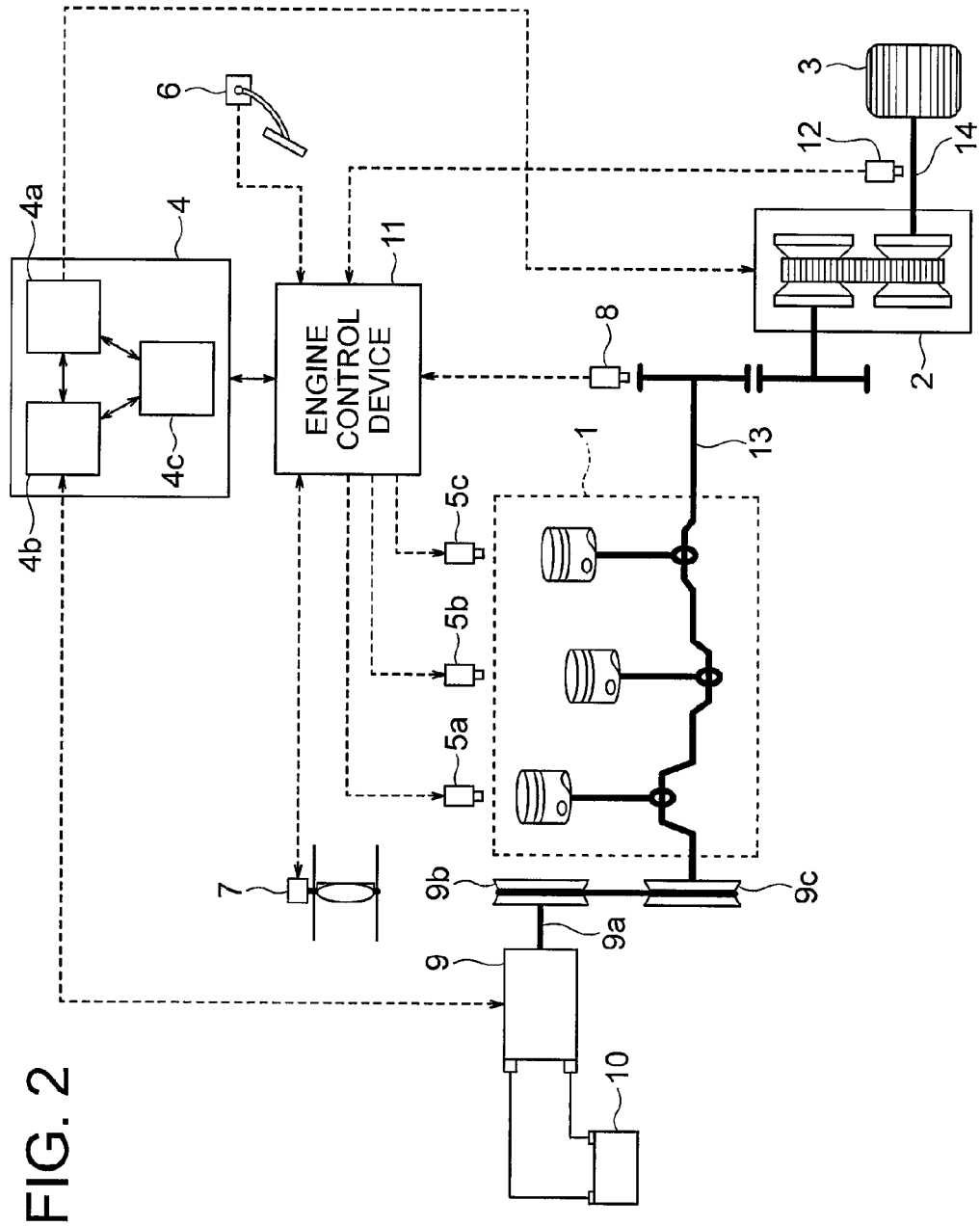
FIG. 2 is a configuration diagram for illustrating a configuration of a transmission control device according to a first embodiment of the present invention.

FIG. 2 is a configuration diagram for illustrating the configuration of the transmission control device according to the first embodiment of the present invention. In FIG. 2, reference numeral 1 represents an engine. Injectors 5a, 5b, and 5c for injecting fuel are provided to the engine 1. The engine 1 causes a vehicle to run by obtaining power through fuel combustion and transmitting the obtained power to a wheel 3 (automobile tire). Reference numeral 9 represents an electric motor. The electric motor 9 includes a mechanical output shaft 9a connected to the engine 1 via pulleys 9b and 9c. The electric motor 9 applies a torque to the engine 1 with use of electric power of a battery 10 (electric storage device), and converts the rotational force from the engine 1 into electric energy during operation of power generation to charge the battery 10. Reference numeral 8 represents an engine rotation speed detecting device. The engine rotation speed detecting device 8 measures a rotation speed of an output shaft 13 of the engine 1, and outputs the information of the rotation speed to an engine control device 11. Reference numeral 2 represents a transmission (CVT: Continuously Variable Transmission). The transmission 2 includes two large-sized pulleys. The transmission 2 continuously changes the diameters of those large-sized pulleys to change the rotational force from the engine 1 and the electric motor 9, and transmits the rotational force to the wheel 3.

Reference numeral 6 represents a driver request torque calculating device. The driver request torque calculating device 6 detects an amount the driver depresses an accelerator pedal. Further, the driver request torque calculating device 6 calculates a driver request torque based on the detected pedal depression amount, and outputs the driver request torque to the engine control device 11. Reference numeral 7 represents an intake air amount adjusting device. The intake air amount adjusting device 7 calculates a current intake air amount, and outputs the current intake air amount to the engine control device 11. Further, the intake air amount adjusting device 7 receives a command value of a target intake air amount from the engine control device 11, and controls a throttle opening degree so that the current intake air amount and the target intake air amount match with each other. Reference numeral 12 represents a wheel rotation speed detecting device. The wheel rotation speed detecting device 12 is provided to an output shaft 14 of the transmission 2. The wheel rotation speed detecting device 12 measures the rotation speed of the wheel 3, and outputs the information of the detected rotation speed to the engine control device 11. Note that, the output shaft 13 of the engine 1 and the output shaft 14 of the transmission 2 construct a power transmission path for mutually transmitting power of the engine 1 and power of the wheel 3.

The engine control device 11 recognizes the operation state of the engine 1 based on the driver request torque transmitted from the driver request torque calculating device 6, the intake air amount transmitted from the intake air amount adjusting device 7, and the rotation speed of the engine transmitted from the engine rotation speed detecting device 8. Further, in order to set the engine 1 to an optimum operation state, the engine control device 11 causes the intake air amount adjusting device 7 to adjust the intake air amount to the engine 1, adjusts the fuel injection amount of the injectors 5a, 5b, and 5c, and instructs an ignition coil (not shown) on ignition, to thereby control the engine 1.

Reference numeral 4 represents a transmission control device for controlling the transmission. The transmission control device 4 stores in advance a drive permission determining condition for the electric motor 9 for determining whether or not the drive of the electric motor 9 is permitted.

The drive permission determining condition for the electric motor 9 is described. When both of the following two conditions (a) and (b) are satisfied, it is determined that the drive permission determining condition for the electric motor 9 is satisfied. When the condition is satisfied, the drive of the electric motor 9 is permitted. On the other hand, when at least one of the following two conditions (a) and (b) is not satisfied, it is determined that the drive permission determining condition for the electric motor 9 is unsatisfied. When the condition is unsatisfied, the drive of the electric motor 9 is prohibited.

<Drive Permission Determining Condition for Electric Motor 9>

(a) The voltage between terminals of the battery 10 is higher than a drive permission determining voltage V1 (first threshold) for the electric motor 9.

(b) The internal temperature of the electric motor 9 is less than a drive permission determining temperature (second threshold) of the electric motor 9.

Figure 6:
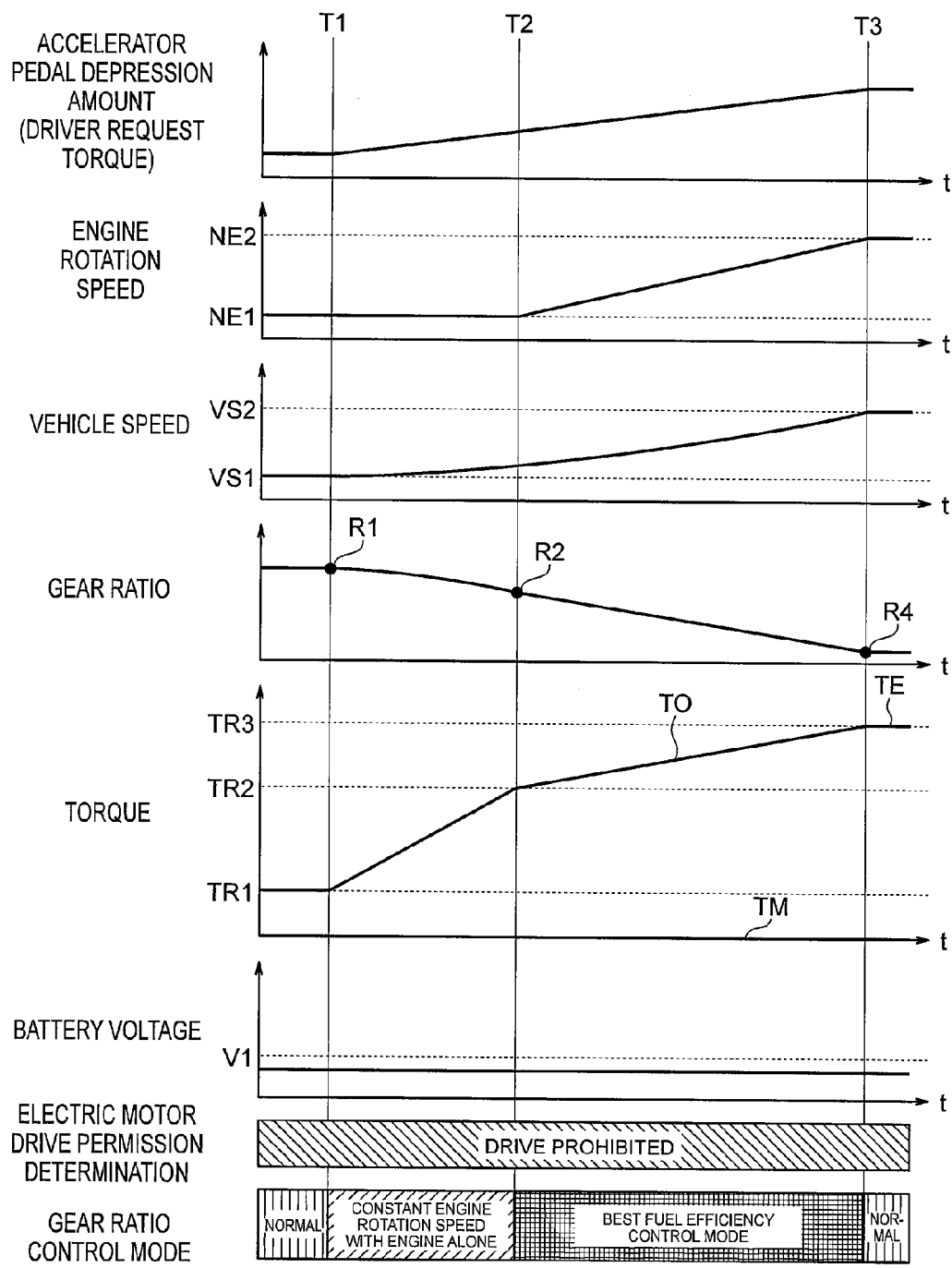
FIG. 6 is a time chart when the electric motor is not driven in the transmission control device according to the first embodiment of the present invention.

Further, the transmission control device 4 stores in advance mode determining conditions 1 to 4 for determining whether or not to switch a gear ratio control mode, and switches the gear ratio control mode based on whether or not the mode determining conditions 1 to 4 are satisfied. The gear ratio control mode includes, as illustrated in FIG. 5 and FIG. 6, a "normal control mode", a "constant engine rotation speed control mode", a "constant transmission output shaft torque control mode (hereinafter referred to as "constant output shaft torque control mode")", and a "best fuel efficiency control mode". Note that, the "constant engine rotation speed control mode" is a mode for controlling the gear ratio so that the rotation speed of the engine is maintained substantially constant. The "constant engine rotation speed control mode" is divided into a "constant engine rotation speed control mode with electric motor drive" in which both of the engine 1 and the electric motor 9 are driven, and a "constant engine rotation speed control mode with engine alone" in which only the engine 1 is driven. Those gear ratio control modes are described later. As illustrated in FIG. 2, the transmission control device 4 includes a gear ratio calculating unit 4a, an electric motor drive torque calculating unit 4b, and an engine torque calculating unit 4c. The gear ratio calculating unit 4a determines a target gear ratio (gear ratio R) with use of calculation described later, and controls the gear ratio of the transmission 2 so as to match with the target gear ratio. The electric motor drive torque calculating unit 4b calculates an electric motor drive torque command value TM* for controlling an output torque TM of the electric motor 9 with use of calculation described later, and outputs the electric motor drive torque command value TM* to the electric motor 9. The engine torque calculating unit 4c calculates an engine torque command value TE* for controlling an engine-alone output torque TE with use of calculation described later, and outputs the engine torque command value TE* to the engine control device 11. The gear ratio calculating unit 4a, the electric motor drive torque calculating unit 4b, and the engine torque calculating unit 4c mutually share information therein, and values calculated in each of the units 4a to 4c can be used for calculation inside another of the units 4a to 4c.

Figure 3:
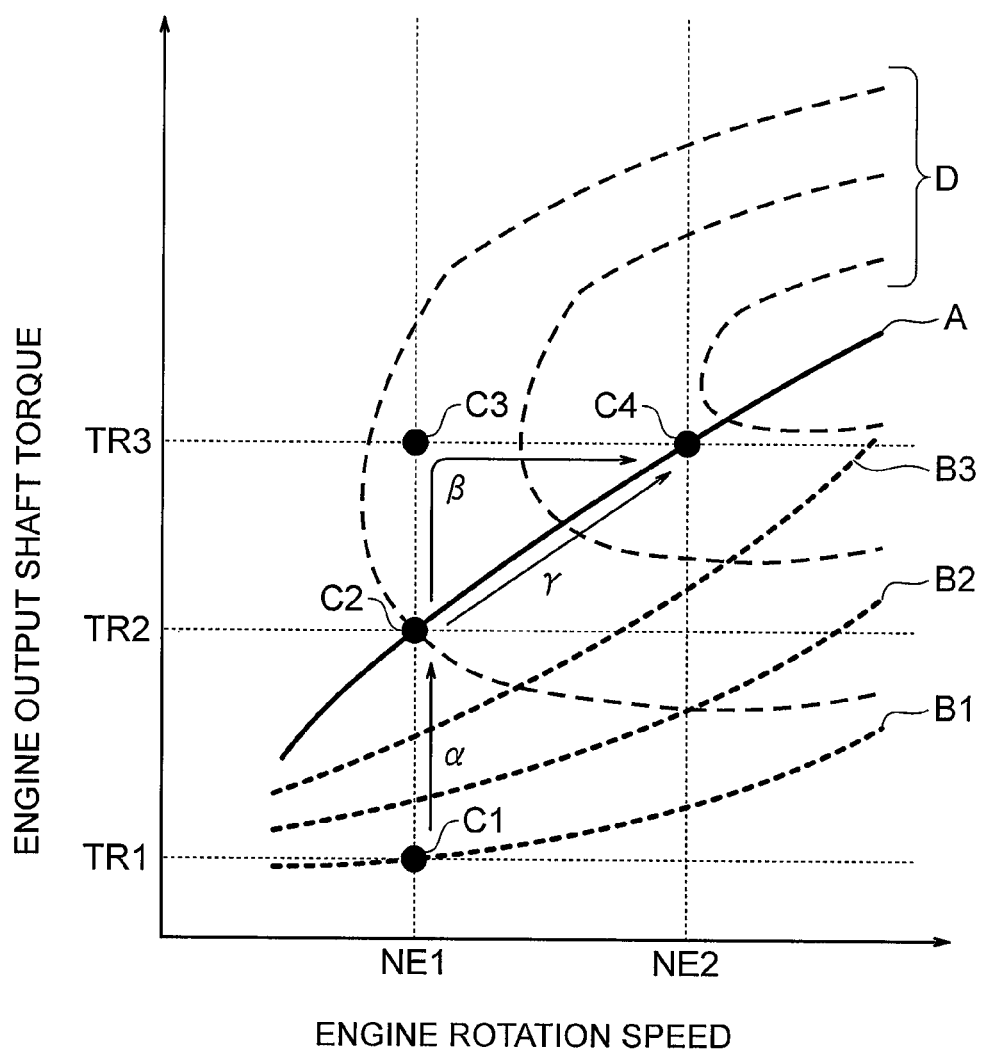
FIG. 3 is a graph for showing an engine operation region according to the first embodiment of the present invention.

Now, the operation of the electric motor 9 according to the first embodiment of the present invention is described with reference to FIG. 3. In FIG. 3, the lateral axis represents the rotation speed of the engine, and the vertical axis represents an "output shaft torque TO of the engine 1". Note that, the "output shaft torque TO of the engine 1" refers to a torque to be output to the wheel 3 from the output shaft 13 of the engine 1. Note that, the torque output by the engine 1 alone through fuel combustion of the engine 1 is referred to as the "engine-alone output torque TE", and the torque output by the electric motor 9 alone (note that, this torque is corrected by the pulley ratio to become the torque value at the output shaft 13 of the engine 1) is referred to as the "output torque TM of the electric motor 9". In this case, because the electric motor 9 is always connected to the engine 1 via the pulleys 9b and 9c, those torques satisfy the following relationship (note that, sometimes, when TM=0 is satisfied, TO=TE is satisfied).

$$TO = TE + TM$$

Further, in FIG. 3, the three curves D represent equal fuel consumption rate characteristics. Each curve D is obtained by connecting the points having equal fuel consumption in the same work amount (that is, equal fuel consumption per unit work amount). Curves D are drawn concentrically. The curve A is obtained by connecting the points having the best fuel efficiency torque values with minimum fuel consumption at respective rotation speed of the engine. Operating the engine 1 on the curve A is defined as a best fuel efficiency operation state of the engine 1. The curves B1 to B3 represent the transition of the operation state of the engine when the vehicle is running in a steady state in a case where the gear ratio is fixed to a predetermined gear ratio. In this case, the gear ratio is defined by Expression 1.

$$\text{Gear ratio} = (\text{rotation speed of the engine})/(\text{rotation speed of the wheel}) \quad (1)$$

Note that, the respective curves B1 to B3 have a relationship that the curve B1 has the largest gear ratio and the curve B3 has the smallest gear ratio. Those curves B1 to B3 represent that the vehicle speed is lower as the rotation speed of the engine 1 is lower, and that the vehicle speed is higher as the rotation speed of the engine 1 is higher. Further, the curves B1 to B3 represent that, when the curves B1 to B3 are compared with each other with the fixed rotation speed of the engine 1 (that is, the curves B1 to B3 are compared with each other with the same rotation speed of the engine (for example, NE1 or NE2)), the vehicle speed is low in the curve B1 having the largest gear ratio, and the vehicle speed is high in the curve B3 having the smallest gear ratio. Points C1 to C4 represent the operation points of the engine 1. In this description, it is supposed that the operation point moves in the sequence of C1→C2→C3→C4. Note that, the path of C1→C2 is referred to as a path α. A path of C2→C3→C4 is referred to as a path β. A path of C2→C4 is referred to as a path γ.

With reference to FIG. 3 (and also FIG. 5), the behavior when the drive permission determining condition for the electric motor 9 is satisfied at C1, but is no longer satisfied at C3 is described. As shown in FIG. 3, it is supposed that, when the engine 1 is outputting TR1 as the output shaft torque TO of the engine 1 in the "normal control mode" and the vehicle is running in a steady state at C1, the driver gradually depresses the accelerator pedal to issue an acceleration request. The driver request torque calculating device 6 calculates the driver request torque based on the pedal depression amount. At this time, the transmission control device 4 determines that the acceleration condition is satisfied based on the increase in the driver request torque, and determines that the mode determining condition 1 is satisfied. Thus, the transmission control device 4 switches the gear ratio control mode from the "normal control mode" to the "constant engine rotation speed control mode with engine alone". The output shaft torque TO of the engine 1 is below the curve A, and the best fuel efficiency operation state is not achieved. At this time, the electric motor 9 is not driven, and hence only the engine-alone output torque TE is used to cover the output shaft torque TO of the engine 1 (TO=TE). Therefore, it is necessary to increase only the engine-alone output torque TE, and the electric motor drive torque command value TM* calculated in the electric motor drive torque calculating unit 4b is zero. The engine torque calculating unit 4c sets the driver request torque to the engine torque command value TE*, and outputs the engine torque command value TE* to the engine control device 11. Based on the command value TE*, the output shaft torque TO of the engine 1 is increased, and hence the rotation speed of the engine 1 is also about to transition in an increasing direction. However, the gear ratio calculating unit 4a sequentially changes the gear ratio so as to maintain the rotation speed of the engine to NE1 that is the rotation speed of the engine at C1, and hence the rotation speed of the engine is maintained at the constant value NE1.

When the depression of the accelerator pedal is continued by the driver, the operation state of the engine 1 reaches C2 that is the best fuel efficiency operation state. The output shaft torque TO of the engine 1 at this time is TR2. When the accelerator pedal is further depressed by the driver, the driver request torque is increased, and hence the output shaft torque TO of the engine 1 is increased up to TR3. At this time, the engine 1 is controlled so as to maintain the best fuel efficiency operation state, and hence the engine torque command value TE* calculated by the engine torque calculating unit 4c is still TR2, and the difference between the driver request torque and TR2 corresponds to the electric motor drive torque command value TM* calculated by the electric motor drive torque calculating unit 4b. Thus, the command value TM* is output to the electric motor 9.

The engine torque command value TE* when the driver request torque and the output shaft torque TO of the engine 1 are equal to each other at C3 is TR2, and the electric motor drive torque command value TM* is the difference between TR3 and TR2 (TR3−TR2). The output shaft torque TO of the engine 1 at C3 is constant, and the vehicle enters an acceleration state because a running resistance is small in a case of a flat road. However, the gear ratio calculating unit 4a calculates the gear ratio so that the gear ratio is decreased along with the increase in the vehicle speed.

When the drive permission determining condition for the electric motor 9 is no longer satisfied during running at C3, the transmission control device 4 switches the gear ratio control mode from the "constant engine rotation speed control mode with electric motor drive" to the "constant output shaft torque control mode". The transmission control device 4 fixes the gear ratio for the purpose of reducing the output torque TM of the electric motor 9 while maintaining the driver request torque TR3. With this, the rotation speed of the engine is increased in association with the increase in the vehicle speed. When the rotation speed of the engine is increased, the best fuel efficiency torque is also increased. The driver request torque is constant, and hence the output torque TM of the electric motor 9 is relatively decreased. When the acceleration state is finally continued at the constant torque, the operation state of the engine 1 reaches C4 that is the engine operation point on the best fuel efficiency curve at which the output torque TM of the electric motor 9 becomes zero while maintaining the output shaft torque TO of the engine 1 at TR3.

Now, the behavior when the drive permission determining condition for the electric motor 9 is no longer satisfied during running at C1 is described with reference to FIG. 3 (and also FIG. 6). The engine 1 outputs TR1 as the output shaft torque TO of the engine 1, and the vehicle is running in a steady state. The driver gradually depresses the accelerator, and thus the driver request torque is gradually increased. The drive permission determining condition for the electric motor 9 is unsatisfied, and hence the gear ratio control mode is switched from the "normal control mode" to the "constant engine rotation speed control mode with engine alone". The output shaft torque TO of the engine 1 is below the curve A, and hence the best fuel efficiency operation state is not achieved. Therefore, in order to achieve the best fuel efficiency, it is necessary to increase the engine-alone output torque TE. The output torque TM of the electric motor 9 is zero, and the engine torque calculating unit 4c sets the driver request torque to the engine torque command value TE*, and outputs the command value TE* to the engine control device 11. The engine-alone output torque TE is increased, but the gear ratio is sequentially changed so as to maintain the rotation speed NE1 of the engine, and hence the rotation speed of the engine is maintained at a constant value.

When the driver continuously depresses the accelerator pedal, the operation state of the engine 1 reaches C2 that is the best fuel efficiency operation state. The output shaft torque TO of the engine 1 at this time is TR2, and the rotation speed of the engine is still NE1. When the accelerator pedal is further depressed, the driver request torque is increased, and hence the output shaft torque TO of the engine 1 is increased up to TR3. At this time, when the drive permission determining condition for the electric motor 9 is satisfied, the difference between the driver request torque and the best fuel efficiency torque TF at NE1 is output from the electric motor 9. However, in this case, the drive permission condition for the electric motor 9 is unsatisfied, and hence it is necessary to satisfy the driver request torque by the engine 1 alone. On the other hand, in order to suppress the fuel consumption low when the same torque is output, it is desired that the operation state of the engine 1 varies on the best fuel efficiency curve A. Therefore, the gear ratio control mode is set to the best fuel efficiency control mode, and the gear ratio is calculated so as to reach C4 at which the driver request torque and the engine-alone output torque TE intersect on the best fuel efficiency curve A. The rotation speed of the engine is gradually increased, and the operation state of the engine 1 reaches C4.

Figure 4A:
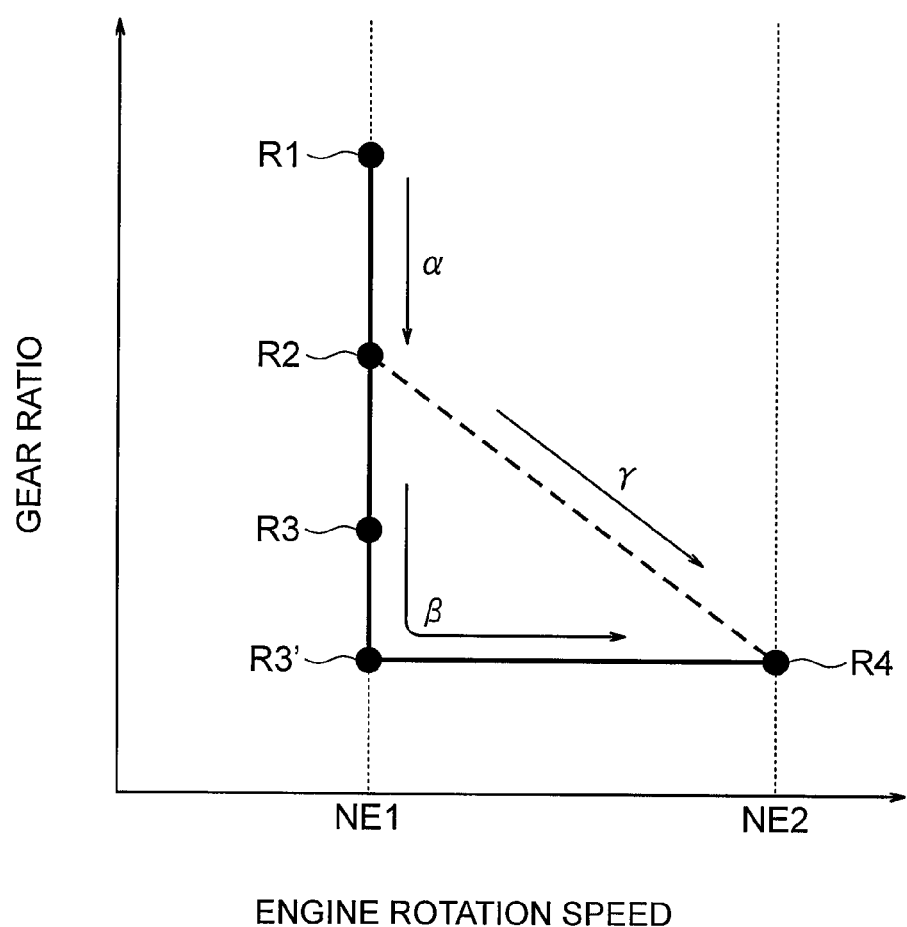
FIG. 4A is a graph for showing the relationship between a rotation speed of the engine and a gear ratio according to the first embodiment of the present invention.
Figure 4B:
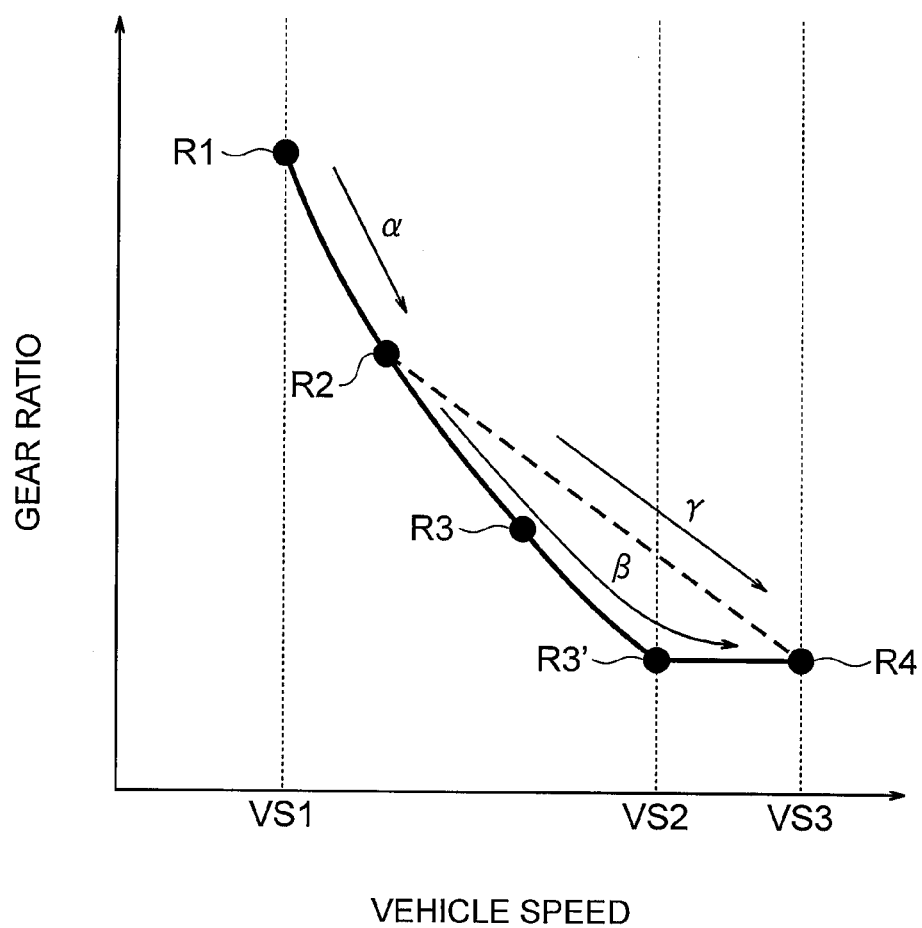
FIG. 4B is a graph for showing the relationship between a vehicle speed and the gear ratio according to the first embodiment of the present invention.

FIG. 4A is a graph for showing the operation of the gear ratio with respect to the rotation speed of the engine. FIG. 4B is a graph for showing the operation of the gear ratio with respect to the vehicle speed. Further, the path α, the path β, and the path γ of FIG. 4A and FIG. 4B correspond to the path α, the path β, and the path γ of FIG. 3, respectively. When the vehicle is running in a steady state at C1 in FIG. 3, the rotation speed of the engine is NE1, the vehicle speed is VS1, and the gear ratio is R1 that is relatively large. When the accelerator pedal is gradually depressed from C1, the gear ratio control mode is set to the "constant engine rotation speed control mode with engine alone". Therefore, the rotation speed of the engine is still NE1, the vehicle speed is increased from VS1, and the gear ratio changes into R2 that is smaller than R1 (see the path α). In this case, when the drive permission determining condition for the electric motor 9 is satisfied, the gear ratio control mode is switched to the "constant engine rotation speed control mode with electric motor drive", and the gear ratio becomes R3 that is smaller than R2 (see the path β). On the other hand, when the drive permission determining condition for the electric motor 9 is unsatisfied, the gear ratio control mode is set to the "best fuel efficiency control mode", and the gear ratio is reduced from R2 to R4 so that the operation point transitions on the best fuel efficiency curve while the rotation speed of the engine is increased from NE1 to NE2 (see the path γ). At C3 at which the driver request torque and the output shaft torque TO of the engine 1 match with each other, the gear ratio immediately after the matching is R3. However, the acceleration state is continued by the applied torque, and the rotation speed of the engine is still NE1. Therefore, the gear ratio becomes R3' that is further smaller than R3 (see the path β). After that, when the drive permission determining condition for the electric motor 9 is no longer satisfied, the gear ratio control mode is switched to the "constant output shaft torque control mode". As a result, the gear ratio is fixed to R3', the rotation speed of the engine is increased from NE1 to NE2, the vehicle speed is also increased from VS2 to VS3, and the operation point reaches C4 (see the path β).

FIG. 5 is a timing chart for illustrating an operation of a case where the drive permission determining condition for the electric motor 9 being satisfied is no longer satisfied when the operation point of the engine 1 is at C3 according to the first embodiment of the present invention. In FIG. 5, the vertical axis represents, from the top, the depression amount of the accelerator pedal, the rotation speed of the engine 1, the vehicle speed, the gear ratio, the torque, the voltage between the terminals of the battery 10, the drive permission determination for the electric motor 9, and the gear ratio control mode. The lateral axis represents time. Note that, TO, TE, and TM in the graph of the torque are those defined in the description above.

In FIG. 5, before time t=T1, the gear ratio control mode is the "normal control mode". Therefore, the vehicle is running in a steady state, and the rotation speed of the engine, the engine torque, the vehicle speed, and the gear ratio are stable at NE1, TR1, VS1, and R1, respectively. Further, the voltage between the terminals of the battery 10 exceeds well over the drive permission determining voltage V1 for the electric motor 9, and the drive permission determining condition for the electric motor 9 is satisfied. However, the drive of the electric motor 9 is stopped (TM=0).

At time t=T1, the driver starts depression of the accelerator pedal so that the depression amount of the accelerator pedal is gradually increased. The transmission control device 4 detects the increase in the depression amount of the accelerator pedal via the engine control device 11, and determines that the acceleration condition has been satisfied. With this, the transmission control device 4 sets the gear ratio control mode to the "constant engine rotation speed control mode with engine alone". The output torque TM of the electric motor 9 is still zero, and the output shaft torque TO of the engine 1 corresponding to the driver request torque is only the engine-alone output torque TE (TO=TE). The vehicle speed is gradually increased, but the rotation speed of the engine is still NE1, and the gear ratio is gradually decreased from R1 in accordance with the increase in the vehicle speed.

At time t=T2, the output shaft torque TO of the engine 1 reaches TR2 that is the best fuel efficiency torque TF at the rotation speed NE1 of the engine. The drive permission determining condition for the electric motor 9 is satisfied, and hence the gear ratio control mode is set to the "constant engine rotation speed control mode with electric motor drive". The driver continuously depresses the accelerator pedal, and thus the driver request torque is also increased. However, the engine-alone output torque TE is maintained at the best fuel efficiency torque TR2, and the electric motor 9 outputs the difference between the driver request torque and TR2 (TO=TE+TM). The rotation speed of the engine is still NE1, and the gear ratio is gradually decreased from R2 in accordance with the increase in the vehicle speed.

At time t=T3, the driver limits the depression of the accelerator pedal so as to keep a constant depression amount. As the gear ratio control mode, the "constant engine rotation speed control mode with electric motor drive" is continued. The engine-alone output torque TE is maintained at TR2. Further, the output torque TM of the electric motor 9 is constant at (TR3−TR2). The drive of the electric motor 9 is continued. Therefore, the storage amount of the battery 10 is gradually decreased, and the voltage between the terminals of the battery 10 is decreased. The rotation speed of the engine is still NE1, and the gear ratio is gradually decreased from R3 in accordance with the increase in the vehicle speed.

At time t=T3', the voltage between the terminals of the battery 10 falls below the drive permission determining voltage V1 for the electric motor 9. With this, the drive permission determining condition for the electric motor 9 being satisfied is no longer satisfied. The gear ratio control mode is switched to the "constant output shaft torque control mode". The accelerator pedal depression amount is not changed. The gear ratio is fixed to R3' so that the output torque TM of the electric motor 9 is gradually decreased while the output shaft torque TO of the engine 1 is still TR3 so as to maintain the driver request torque. When the vehicle speed is increased, the rotation speed of the engine is also increased, and thus the best fuel efficiency torque is also increased. Therefore, the engine-alone output torque TE is also increased, and hence the output torque TM of the electric motor 9 is relatively decreased (TM=TO−TE).

At time t=T4, the output torque TM of the electric motor 9 can be decreased down to zero and the engine-alone output torque TE can be increased up to TR3 so that the output shaft torque TO of the engine 1 is maintained at TR3 that is the driver request torque.

As described above, in this embodiment, when the acceleration condition is satisfied at time t=T1 due to the depression of the accelerator pedal by the driver, the transmission control device 4 sets the gear ratio control mode to the "constant engine rotation speed control mode" for maintaining the rotation speed of the engine 1 substantially constant. In this mode, the gear ratio calculating unit 4*a* calculates the target gear ratio of the transmission 2 so that the fluctuation range of the rotation speed of the engine falls within a predetermined range.

Note that, when it is determined that the drive of the electric motor 9 is permitted as in the case of FIG. 5, first, at time t=T1, the transmission control device 4 sets the gear ratio control mode to the "constant engine rotation speed control mode with engine alone" in the "constant engine rotation speed control mode". In this mode, the engine torque calculating unit 4*c* calculates the engine torque command value TE* so as to achieve the best fuel efficiency operation state. Based on the command value TE*, the engine-alone output torque TE is gradually increased, and when the output torque TE reaches the best fuel efficiency torque TR2 at the current rotation speed of the engine, the transmission control device 4 switches the gear ratio control mode from the "constant engine rotation speed control mode with engine alone" to the "constant engine rotation speed control mode with electric motor drive". In this mode, the engine torque calculating unit 4*c* maintains the engine-alone output torque TE to the best fuel efficiency torque TR2 so as to achieve the best fuel efficiency operation state. Further, the electric motor drive torque calculating unit 4*b* calculates the electric motor drive torque command value TM* so that the electric motor 9 outputs the torque corresponding to the deviation between the best fuel efficiency torque TR2 and the driver request torque calculated by the driver request torque calculating device 6.

FIG. 6 is a timing chart for illustrating an operation of a case where the drive permission determining condition for the electric motor 9 is continuously unsatisfied during the operation according to the first embodiment of the present invention. In FIG. 6, the operation at time t=T1 is the same as the operation at time t=T1 of FIG. 5. Further, the operation at time t=T3 of FIG. 6 is the same as that at time t=T4 of FIG. 5. Therefore, description of those operations is omitted herein.

In FIG. 6, the drive of the electric motor 9 is continuously stopped, and hence the output torque TM of the electric motor 9 is kept zero all the time. Therefore, in FIG. 6, TO=TE is constantly satisfied.

At time t=T2, the output shaft torque TO of the engine 1 reaches TR2 that is the best fuel efficiency torque TF at the rotation speed NE1 of the engine. The voltage between the terminals of the battery 10 is below V1 that is the drive permission determining voltage for the electric motor 9, and hence the drive permission determining condition for the electric motor 9 is unsatisfied. The driver continuously depresses the accelerator pedal, and hence the driver request torque is also increased, but the drive of the electric motor 9 is prohibited. Therefore, since the driver request torque should be output only by the engine 1, it is necessary to increase the engine-alone output torque TE. Therefore, the gear ratio control mode is switched to the "best fuel efficiency control mode" so that the gear ratio is switched to maintain the best fuel efficiency drive torque and the driver request torque by the engine-alone output torque TE. The driver request torque is increased, and the rotation speed of the engine and the vehicle speed are also increased. With this, at time t=T3, the engine-alone output torque TE can be increased up to TR3.

As described above, also in the case of FIG. 6, in this embodiment, when the acceleration condition is satisfied due to the depression of the accelerator pedal by the driver, the transmission control device 4 sets the gear ratio control mode to the "constant engine rotation speed control mode" for maintaining the rotation speed of the engine 1 substantially constant. In this mode, the gear ratio calculating unit 4*a* calculates the target gear ratio of the transmission 2 so that the fluctuation range of the rotation speed of the engine falls within a predetermined range.

Note that, when it is determined that the drive of the electric motor 9 is prohibited as in the case of FIG. 6, first, the transmission control device 4 sets the gear ratio control mode to the "constant engine rotation speed control mode with engine alone" in the "constant engine rotation speed control mode". In this mode, the engine torque calculating unit 4*c* calculates the engine torque command value TE* so as to achieve the best fuel efficiency operation state. Based on the command value TE*, the engine-alone output torque TE is gradually increased, and when the output torque TE reaches the best fuel efficiency torque TR2 at the current rotation speed of the engine, the transmission control device 4 switches the gear ratio control mode from the "constant engine rotation speed control mode with engine alone" to the "best fuel efficiency control mode". In this mode, the engine torque calculating unit 4c calculates the engine torque TE* so as to achieve the best fuel efficiency operation state. On the other hand, the drive of the electric motor 9 is prohibited, and hence the electric motor drive torque calculating unit 4b does not calculate the electric motor drive torque command value TM*.

Figure 7:
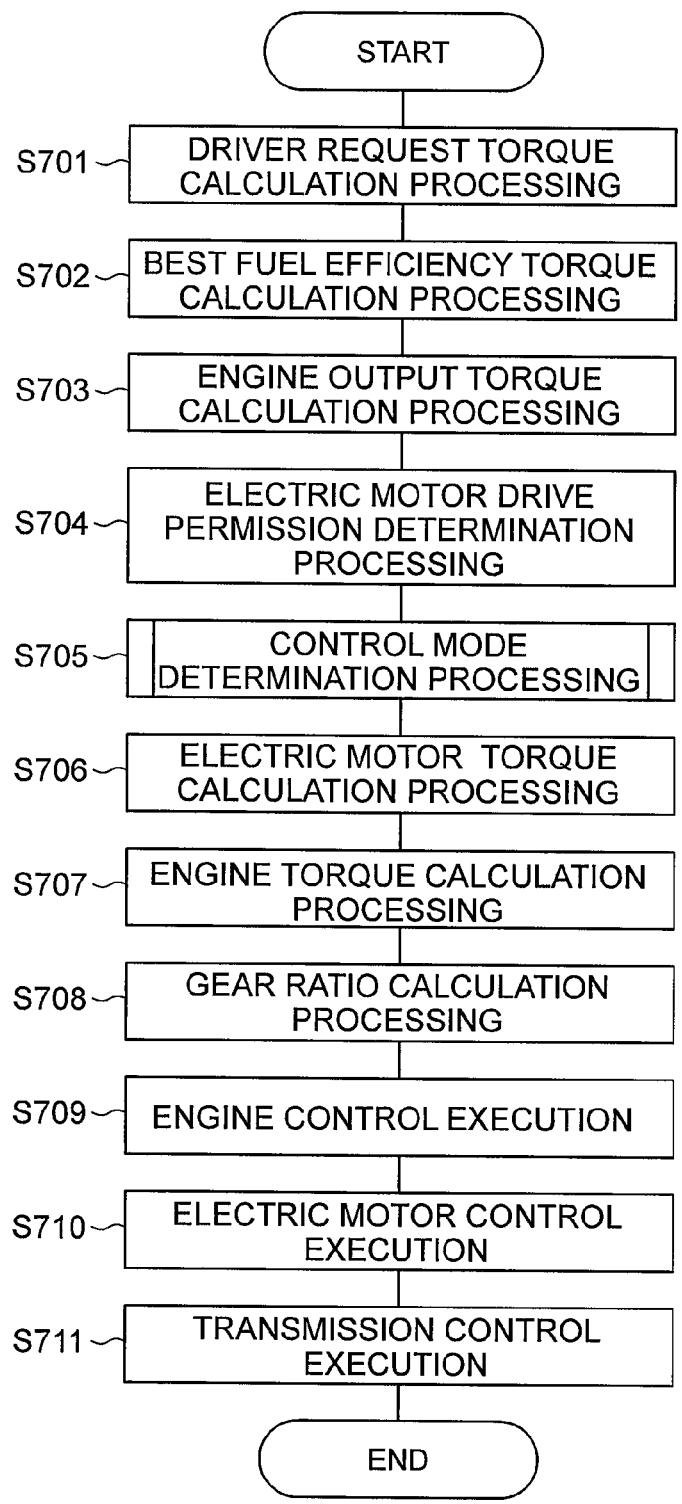
FIG. 7 is a flow chart for illustrating a processing flow of the transmission control device according to the first embodiment of the present invention.
Figure 8:
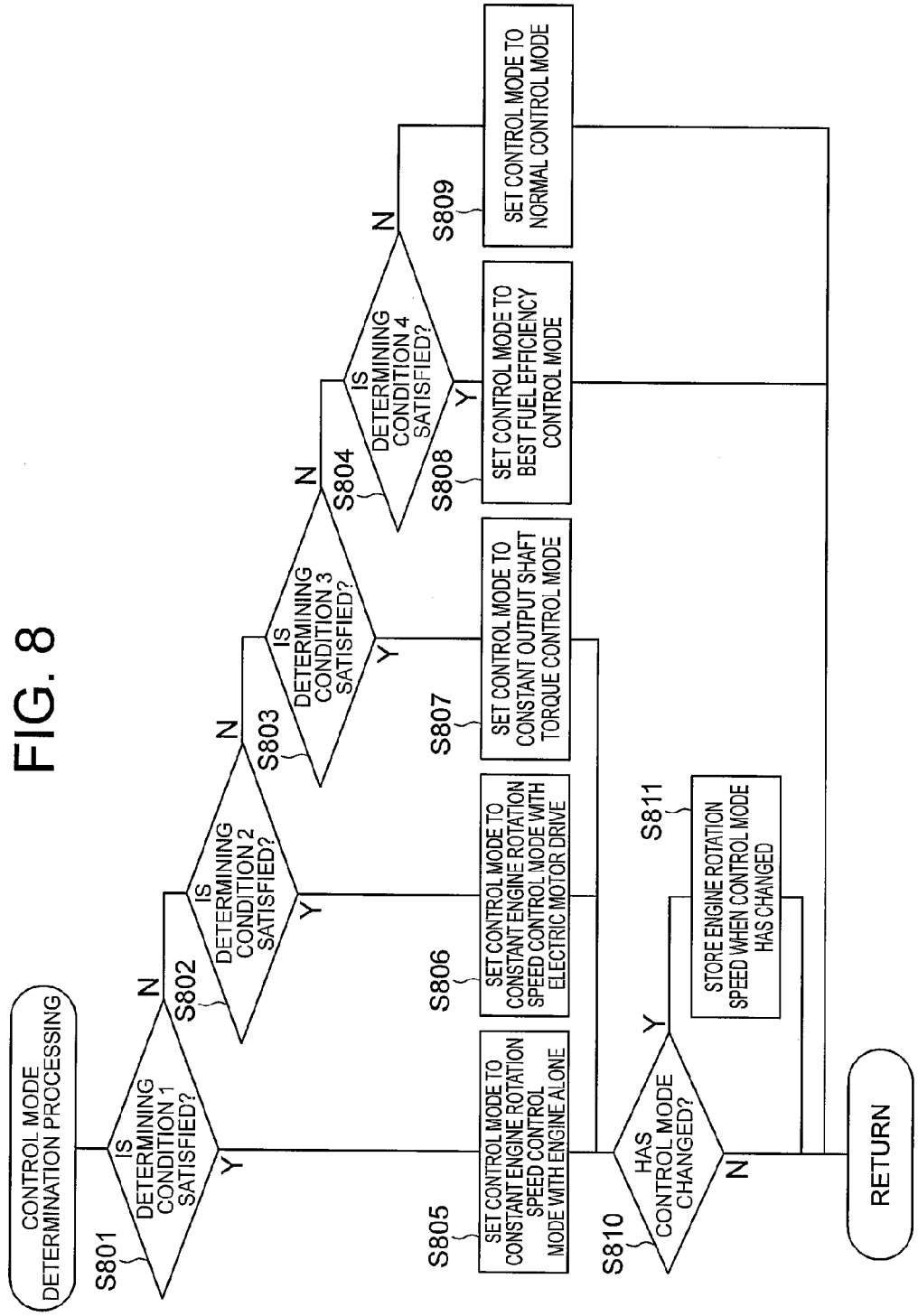
FIG. 8 is a flow chart for illustrating control mode determination processing of the transmission control device according to the first embodiment of the present invention.

FIG. 7 and FIG. 8 are each a flow chart for illustrating the operation of the transmission control device 4 according to the first embodiment of the present invention.

First, in Step S701, the driver request torque calculating device 6 calculates the driver request torque based on the depression amount of the accelerator pedal. The calculation method is described. The driver request torque calculating device 6 stores therein a table that stores each value of the driver request torque with respect to the depression amount of the accelerator pedal, and calculates the driver request torque with use of this table through linear interpolation based on the depression amount of the accelerator pedal. The calculated driver request torque is transmitted to the transmission control device 4 via the engine control device 11, and then the processing proceeds to Step S702.

In Step S702, the transmission control device 4 calculates the best fuel efficiency torque TF at the current rotation speed of the engine. The calculation method is described. The engine rotation speed detecting device 8 detects the rotation speed of the engine 1, and transmits the rotation speed of the engine to the transmission control device 4 via the engine control device 11. The transmission control device 4 stores therein a table that stores the best fuel efficiency torque TF with respect to the rotation speed of the engine, and calculates the best fuel efficiency torque TF with use of this table through linear interpolation based on the rotation speed of the engine transmitted from the engine rotation speed detecting device 8. Then, the processing proceeds to Step S703.

In Step S703, the engine control device 11 calculates the engine-alone output torque TE based on the intake air amount and the rotation speed of the engine, and transmits the output torque TE to the transmission control device 4. Then, the processing proceeds to Step S704. The calculation method is described. The engine control device 11 stores therein a table that stores each value of the engine-alone output torque TE with respect to the values of the intake air amount and the rotation speed of the engine, and calculates the engine-alone output torque TE with use of this table through linear interpolation based on the intake air amount transmitted from the intake air amount adjusting device 7 and the rotation speed of the engine transmitted from the engine rotation speed detecting device 8.

In Step S704, the transmission control device 4 determines whether or not the drive permission determining condition for the electric motor 9 described above is satisfied, and determines whether or not the drive of the electric motor 9 is permitted. After the determination, the processing proceeds to Step S705. The determination method is described. When (a) the voltage between the terminals of the battery 10 is higher than the drive permission determining voltage V1 for the electric motor 9, and (b) the internal temperature of the electric motor 9 is less than the drive permission determining temperature of the electric motor 9, it is determined that the drive permission determining condition for the electric motor 9 is satisfied. The voltage between the terminals of the battery 10 is detected by a battery inter-terminal voltage detector (not shown), and the detected voltage is transmitted to the transmission control device 4. The electric motor 9 includes therein a temperature sensor (not shown), and the information on the internal temperature of the electric motor 9 is transmitted from the electric motor 9 to the transmission control device 4.

In Step S705, the transmission control device 4 determines the gear ratio control mode with use of the mode determining conditions 1 to 4. Details of the subroutine of the processing of determining the gear ratio control mode are described later with reference to FIG. 8.

In Step S706, the electric motor drive torque calculating unit 4b of the transmission control device 4 calculates the electric motor drive torque command value TM* to be issued to the electric motor 9, and then the processing proceeds to Step S707. The calculation method is as follows. The electric motor drive torque calculating unit 4b has a calculation expression for calculating the electric motor drive torque command value TM* for each of the gear ratio control modes, and hence the calculation expression is changed in accordance with the gear ratio control mode determined in Step S705, to thereby calculate the electric motor drive torque command value TM*.

(1) When the gear ratio control mode is the "constant engine rotation speed control mode with engine alone"

$$\text{Electric motor drive torque command value } TM^*=0 \quad (2)$$

(2) When the gear ratio control mode is the "constant engine rotation speed control mode with electric motor drive"

$$\text{Electric motor drive torque command value } TM^*= \\ \text{(driver request torque)}-\text{(engine-alone output torque } TE) \quad (3)$$

(3) When the gear ratio control mode is the "constant output shaft torque control mode"

$$\text{Electric motor drive torque command value} \\ TM^*=\text{MAX(previous value of the output torque} \\ TM \text{ of the electric motor 9-torque change rate} \\ \Delta TR, 0) \quad (4)$$

In this case, MAX(A,B) represents the maximum values of A and B. Further, the torque change rate ΔTR is a setting value (constant value) stored in advance in the transmission control device 4.

(4) When the gear ratio control mode is the "best fuel efficiency control mode"

$$\text{Electric motor drive torque command value } TM^*=0 \quad (5)$$

(5) When the gear ratio control mode is the "normal control mode"

$$\text{Electric motor drive torque command value } TM^*=0 \quad (6)$$

In Step S707, the engine torque calculating unit 4c of the control device 4 calculates the engine torque command value TE* to be issued to the engine control device 11, and then the processing proceeds to Step S708. The calculation method is as follows. The engine torque calculating unit 4c has a calculation expression for calculating the engine torque command value TE* for each of the gear ratio control modes, and hence the calculation expression is changed in accordance with the gear ratio control mode determined in Step S705, to thereby calculate the engine torque command value TE*.

(1) When the gear ratio control mode is the "constant engine rotation speed control mode with engine alone"

Engine torque command value TE*=driver request
torque    (7)

(2) When the gear ratio control mode is the "constant engine rotation speed control mode with electric motor drive"

Engine torque command value TE*=best fuel efficiency torque TF    (8)

(3) When the gear ratio control mode is the "constant output shaft torque control mode"

Engine torque command value TE*=MIN(previous value of the engine-alone output torque TE+torque change rate $\Delta TR$,driver request torque)    (9)

In this case, MIN(A,B) represents the minimum values of A and B.

(4) When the gear ratio control mode is the "best fuel efficiency control mode"

Engine torque command value TE*=driver request torque    (10)

(5) When the gear ratio control mode is the "normal control mode"

Engine torque command value TE*=driver request torque    (11)

In Step S708, the transmission control device 4 calculates the gear ratio R to be issued to the transmission 2, and then the processing proceeds to Step S709. The calculation method is changed depending on the gear ratio control mode determined in Step S705. That is, the gear ratio calculating unit 4a of the transmission control device 4 has a calculation expression or a calculation table for calculating the gear ratio R for each of the gear ratio control modes, and changes the calculation expression or the calculation table depending on the current gear ratio control mode, to thereby calculate the gear ratio R.

(1) When the gear ratio control mode is the "constant engine rotation speed control mode with engine alone"

The gear ratio calculating unit 4a of the transmission control device 4 calculates the gear ratio R by the following calculation expression.

Gear ratio R=(rotation speed of the engine when the gear ratio control mode is changed)/(rotation speed of the wheel)    (12)

(2) When the gear ratio control mode is the "constant engine rotation speed control mode with electric motor drive"

The gear ratio calculating unit 4a of the transmission control device 4 calculates the gear ratio R by the following calculation expression.

Gear ratio R=(rotation speed of the engine when the gear ratio control mode is changed)/(rotation speed of the wheel)    (13)

(3) When the gear ratio control mode is the "constant output shaft torque control mode"

The gear ratio calculating unit 4a of the transmission control device 4 calculates the gear ratio R by the following calculation expression.

Gear ratio R=previous value of the gear ratio R    (14)

(4) When the gear ratio control mode is the "best fuel efficiency control mode"

The gear ratio calculating unit 4a of the transmission control device 4 stores therein in advance a gear ratio calculation table for the best fuel efficiency control mode, which stores each value of the gear ratio with respect to the driver request torque and the rotation speed of the engine, and determines the gear ratio R with use of this table through linear interpolation based on the driver request torque and the rotation speed of the engine.

(5) When the gear ratio control mode is the "normal control mode"

The gear ratio calculating unit 4a of the transmission control device 4 stores therein in advance a gear ratio calculation table for the normal control mode, which stores each value of the gear ratio with respect to the driver request torque and the rotation speed of the engine, and determines the gear ratio R with use of this table through linear interpolation based on the driver request torque and the rotation speed of the engine.

In Step S709, the transmission control device 4 transmits the engine torque command value TE* calculated in Step S707 to the engine control device 11. The engine control device 11 controls the engine 1 so that the engine-alone output torque TE becomes to the engine torque command value TE* transmitted from the transmission control device 4. Then, the processing proceeds to Step S710.

In Step S710, the transmission control device 4 controls the electric motor 9 so that the output torque TM of the electric motor 9 becomes to the electric motor drive torque command value TM* calculated in Step S706. Then, the processing proceeds to Step S711.

In Step S711, the transmission control device 4 controls the transmission 2 so as to achieve the gear ratio R calculated in Step S708. Then, the routine is ended.

Now, with reference to FIG. 8, details of the subroutine of the processing of determining the gear ratio control mode in Step S705 of FIG. 7 are described.

First, in Step S801, it is determined whether or not the following mode determining condition 1 is satisfied. When the mode determining condition 1 is satisfied, the processing proceeds to Step S805, and when the mode determining condition 1 is unsatisfied, the processing proceeds to Step S802.

<Mode Determination Condition 1>

When the following condition (c1) is satisfied, the mode determining condition 1 is satisfied.

(c1) The driver request torque is smaller than the best fuel efficiency torque TF.

In Step S802, it is determined whether or not the following mode determining condition 2 is satisfied. When the mode determining condition 2 is satisfied, the processing proceeds to Step S806, and when the mode determining condition 2 is unsatisfied, the processing proceeds to Step S803.

<Mode Determination Condition 2>

When the following conditions (c2) and (c3) are all satisfied, the mode determining condition 2 is satisfied.

(c2) The driver request torque is equal to or larger than the best fuel efficiency torque TF.

(c3) The drive permission determining condition of the electric motor 9 is satisfied.

In Step S803, it is determined whether or not the following mode determining condition 3 is satisfied. When the mode determining condition 3 is satisfied, the processing proceeds to Step S807, and when the mode determining condition 3 is unsatisfied, the processing proceeds to Step S804.

<Mode Determination Condition 3>

When the following conditions (c4) and (c5) are all satisfied, the mode determining condition 3 is satisfied.

(c4) The previous value of the output torque TM of the electric motor 9 is larger than zero.

(c5) The drive permission determining condition for the electric motor 9 is unsatisfied.

In Step S804, it is determined whether or not the following mode determining condition 4 is satisfied. When the mode determining condition 4 is satisfied, the processing proceeds to Step S808, and when the mode determining condition 4 is unsatisfied, the processing proceeds to Step S809.

<Mode Determination Condition 4>

When the following conditions (c6) and (c7) are all satisfied, the mode determining condition 4 is satisfied.

(c6) The previous value of the output torque TM of the electric motor 9 is equal to or less than zero.

(c7) The drive permission determining condition for the electric motor 9 is unsatisfied.

In Step S805, the transmission control device 4 sets the gear ratio control mode to the "constant engine rotation speed control mode with engine alone", and then the processing proceeds to Step S810.

In Step S806, the transmission control device 4 sets the gear ratio control mode to the "constant engine rotation speed control mode with electric motor drive", and then the processing proceeds to Step S810.

In Step S807, the transmission control device 4 sets the gear ratio control mode to the "constant output shaft torque control mode", and then the processing proceeds to Step S810.

In Step S808, the transmission control device 4 sets the gear ratio control mode to the "best fuel efficiency control mode", and then the subroutine is ended.

In Step S809, the transmission control device 4 sets the gear ratio control mode to the "normal control mode", and then the subroutine is ended.

In Step S810, it is determined whether or not the gear ratio control mode has changed. When the previous value of the gear ratio control mode is equal to the current value of the gear ratio control mode, the subroutine is ended. In contrast, when the previous value of the gear ratio control mode is not equal to the current value of the gear ratio control mode, the processing proceeds to Step S811.

In Step S811, the current rotation speed of the engine is stored in the transmission control device 4 as the rotation speed of the engine when the gear ratio control mode is changed, and then the subroutine is ended.

Note that, in the first embodiment, it is only required that the vehicle be runnable with both of the engine-alone output torque TE and the output torque TM of the electric motor 9. Therefore, as described above, the electric motor 9 may be configured of a generator motor, but the present invention is not limited to this case. The electric motor 9 may be simply configured of an electric motor that does not generate electric power, and no problem in terms of function arises even in this case.

Further, in the above-mentioned first embodiment, as the drive permission determining condition for the electric motor 9, two determining conditions of (a) whether or not the voltage between the terminals of the battery 10 is higher than the first threshold, and (b) whether or not the internal temperature of the electric motor 9 is less than the second threshold are used, but the present invention is not limited to this case. Since it is only required to determine whether or not the electric motor 9 can output the output torque TM which is equal to or higher than a constant level, other conditions may be used.

As described above, the transmission control device 4 according to the first embodiment of the present invention is used while being mounted on a vehicle including the engine 1 and the electric motor 9 as power sources. The vehicle includes the engine 1 for causing the vehicle to run by transmitting power obtained through fuel combustion to the wheel 3, the power transmission path 13 and 14 for mutually transmitting the power of the engine 1 and the power of the wheel 3, the electric motor 9 for applying a torque to the power transmission path 13 and 14 by the electric power of the battery 10 (electric storage device), and generating electric power by the torque of the power transmission path 13 and 14 to charge the battery 10, the transmission 2 disposed in the power transmission path 13 and 14, for changing the rotation speed of each of the engine 1 and the electric motor 9, the engine control device 11 for controlling the output of the engine 1 by adjusting the intake air amount and the fuel injection amount to the engine 1, and the driver request torque calculating device 6 for calculating the driver request torque based on the depression amount of the accelerator pedal by the driver. The transmission control device 4 has the plurality of gear ratio control modes, and is configured to determine the gear ratio control mode based on the state of the vehicle and determine whether or not the drive of the electric motor 9 is permitted based on the drive permission determining condition for the electric motor 9. Further, the transmission control device 4 includes the gear ratio calculating unit 4a for calculating the target gear ratio of the transmission 2 based on the current gear ratio control mode, to thereby control the transmission 2 so as to achieve the target gear ratio, the electric motor drive torque calculating unit 4b for calculating the electric motor drive torque command value TM* based on the current gear ratio control mode when it is determined that the drive of the electric motor 9 is permitted, and the engine torque calculating unit 4c for calculating the engine torque command value TE* based on the current gear ratio control mode. The gear ratio calculating unit 4a switches the processing of calculating the gear ratio based on whether or not the drive of the electric motor 9 is permitted (drive permission/prohibition). With the above-mentioned configuration, it is possible to obtain such an effect that the fuel consumption can be minimized regardless of the drive permission/prohibition of the electric motor 9.

Further, the transmission control device 4 has, as one of the gear ratio control modes, the constant engine rotation speed control mode for maintaining the rotation speed of the engine 1 substantially constant. When the transmission control device 4 sets the current gear ratio control mode to the constant engine rotation speed control mode, the gear ratio calculating unit 4a calculates the target gear ratio of the transmission 2 so that the rotation speed of the engine is substantially constant (that is, the fluctuation range of the rotation speed of the engine falls within a predetermined range). With the above-mentioned configuration, even when the acceleration request is issued from the driver, the rotation speed of the engine is maintained which is a smaller value obtained at the time of start of the acceleration. Therefore, there is such an effect that the minimum fuel consumption state can be obtained.

Further, the transmission control device 4 has, as one of the gear ratio control modes, the constant transmission output shaft torque control mode for gradually decreasing the output torque TM of the electric motor 9 when the electric motor drive permission determining condition being satisfied is no longer satisfied. The transmission control device 4 determines that the voltage of the battery 10 is lower than the electric motor drive permission voltage, and sets the gear ratio control mode to the constant transmission output shaft torque control mode. In this mode, the engine torque calculating unit 4c gradually increases the engine torque command value TE* so as to achieve the driver request torque only by the engine-alone output torque TE while maintaining the best fuel efficiency operation state. The electric motor drive torque calculating unit 4b calculates the electric motor drive torque command value TM* so that the electric motor 9 outputs the torque corresponding to the deviation between the engine-alone output torque TE and the driver request torque calculated by the driver request torque calculating device 6. The gear ratio calculating unit 4a controls the gear ratio so as to achieve the driver request torque only by the output torque TE of the engine alone while maintaining the best fuel efficiency operation state at the rotation speed of the engine. With this configuration, the ratio of the output torque TM of the electric motor 9 can be gradually decreased in accordance with the increase in the vehicle speed under a state in which the driver request torque and the best fuel efficiency operation state are maintained. Therefore, the ratio between the engine-alone output torque TE and the output torque TM of the electric motor 9 in the output shaft torque TO of the engine 1 can be adjusted to an arbitrary value.

Further, the transmission control device 4 is configured to switch the gear ratio control mode from the constant engine rotation speed control mode to the constant transmission output shaft torque control mode when the drive permission determining condition for the electric motor 9 being satisfied is no longer satisfied during control of the gear ratio in the constant engine rotation speed control mode. With this, even when the drive of the electric motor 9 is prohibited for some reasons, the ratio of the output torque TM of the electric motor 9 in the output shaft torque TO of the engine 1 can be rapidly decreased.

Further, the transmission control device 4 has, as one of the gear ratio control modes, the best fuel efficiency control mode for controlling the gear ratio so as to achieve the driver request torque only by the engine-alone output torque TE while maintaining the best fuel efficiency operation state of the engine 1. When the drive permission determining condition is unsatisfied and the driver request torque exceeds the best fuel efficiency torque at the current rotation speed of the engine during the control of the gear ratio in the constant engine rotation speed control mode for maintaining the rotation speed of the engine 1 substantially constant, the transmission control device 4 switches the gear ratio control mode from the constant engine rotation speed control mode to the best fuel efficiency control mode. With this configuration, even when the drive of the electric motor 9 is prohibited for some reasons, the amount of fuel to be consumed by the engine 1 can be minimized.

Further, the gear ratio calculating unit 4a has the calculation expression or the calculation table for calculating the gear ratio R for each of the gear ratio control modes, and changes the calculation expression or the calculation table depending on the current gear ratio control mode, to thereby calculate the gear ratio R. As described above, the gear ratio calculating unit 4a switches the processing of calculating the gear ratio based on whether or not the drive of the electric motor 9 is permitted (drive permission/prohibition). With the above-mentioned configuration, the fuel consumption can be suppressed low regardless of the drive permission/prohibition of the electric motor 9.

Further, the drive permission determining condition for the electric motor 9 is satisfied when the temperature of the electric motor 9 is less than the second threshold, but is unsatisfied when the temperature of the electric motor 9 is equal to or more than the second threshold. With this, it is possible to accurately determine the drive permission/prohibition of the electric motor 9. Therefore, before the temperature of the electric motor 9 reaches an overheated temperature, the engine-alone output torque TE can be increased, and in this state, the drive of the electric motor 9 can be stopped, to thereby suppress the temperature rise.

Further, the drive permission determining condition for the electric motor 9 is satisfied when the voltage of the battery 10 for supplying electric power to the electric motor 9 is more than the first threshold, but is unsatisfied when the voltage of the battery 10 is equal to or less than the first threshold. With this, even when the voltage of the battery 10 is decreased, the drive of the electric motor 9 can be rapidly stopped while maintaining the driver request torque. Therefore, it is possible to prevent the drive of the electric motor 9 from being continued under a state in which the voltage of the battery 10 is lower than the electric motor drive permission determining voltage for the battery 10.

Further, the electric motor 9 is configured of a generator motor for applying a torque to the power transmission path 13 and 14 by the electric power of the battery 9, and generating electric power by the torque of the power transmission path 13 and 14 to charge the battery 10. With this, a device for carrying out both of power generation and drive can be realized with the same single device, and hence the device can be downsized.

REFERENCE NUMERALS LIST 1 engine, 2 transmission, 3 wheel, 4 transmission control device, 4a gear ratio calculating unit, 4b electric motor drive torque calculating unit, 4c engine torque calculating unit, 5a injector, 5b injector, 5c injector, 6 driver request torque calculating device, 7 intake air amount adjusting device, 8 engine rotation speed detecting device, 9 electric motor, 10 battery (electric storage device), 11 engine control device, 12 wheel rotation speed detecting device, 13 output shaft of engine 1, 14 output shaft of transmission 2

The invention claimed is:

1. A transmission control device to be mounted on a vehicle, for controlling a transmission,
the vehicle comprising:
an engine for transmitting power obtained through fuel combustion to a wheel of the vehicle so as to run the vehicle;
a power transmission path for mutually transmitting the power of the engine and power of the wheel;
an electric motor for applying a torque to the power transmission path by electric power of an electric storage device;
the transmission disposed in the power transmission path, for changing a rotation speed of the engine and a rotation speed of the electric motor;
an engine control device for controlling an output of the engine by adjusting an intake air amount and a fuel injection amount to the engine; and
a driver request torque calculating device for calculating a driver request torque based on an amount a driver depresses an accelerator pedal,
the transmission control device having a plurality of gear ratio control modes,
the transmission control device being configured to change a gear ratio control mode depending on a state of the vehicle, and determine that, based on a drive permission determining condition for the electric motor, a drive of the electric motor is permitted when the drive permission determining condition is satisfied and the drive of the electric motor is prohibited when the drive permission determining condition is unsatisfied, the transmission control device comprising:

a processor configured to execute a program; and a memory that stores the program which, when executed by the processor, results in performance of steps comprising, calculating a target gear ratio of the transmission based on a current gear ratio control mode, to thereby control the transmission to achieve the target gear ratio;

calculating a drive torque of the electric motor based on the current gear ratio control mode when it is determined that the drive of the electric motor is permitted; and calculating an output torque of the engine based on the current gear ratio control mode so as to achieve a best fuel efficiency operation state with minimum fuel consumption per unit work amount of the engine, wherein the calculating the target gear ratio comprises: switching of a method used to calculate the gear ratio based on whether or not the drive of the electric motor is permitted.

2. The transmission control device according to claim 1, wherein the transmission control device has, as one of the plurality of gear ratio control modes, a constant engine rotation speed control mode for maintaining the rotation speed of the engine substantially constant, and wherein the calculating the target gear ratio comprises:

calculating the target gear ratio of the transmission so that a fluctuation range of the rotation speed of the engine falls within a predetermined range, when the transmission control device sets the constant engine rotation speed control mode as the current gear ratio control mode.

3. The transmission control device according to claim 2, wherein the transmission control device has, as one of the plurality of gear ratio control modes, a constant transmission output shaft torque control mode for decreasing the torque to be output from the electric motor when the electric motor drive permission determining condition being satisfied is no longer satisfied, and wherein, when the transmission control device determines that a voltage of the electric storage device is below a drive permission voltage for the electric motor and sets the constant transmission output shaft torque control mode as the current gear ratio control mode, the calculating the output torque of the engine comprises: increasing the output torque of the engine so as to achieve the driver request torque only by the output torque of the engine while maintaining the best fuel efficiency operation state, the calculating the drive torque of the electric motor comprises: calculating the drive torque of the electric motor so that the electric motor outputs a torque corresponding to a deviation between the output torque of the engine and the driver request torque calculated by the driver request torque calculating device, and the calculating the target gear ratio comprises: controlling the gear ratio so as to achieve the driver request torque only by the output torque of the engine while maintaining the best fuel efficiency operation state at the rotation speed of the engine.

4. The transmission control device according to claim 3, wherein, when the electric motor drive permission determining condition being satisfied is no longer satisfied during control of the gear ratio in the constant engine rotation speed control mode for maintaining the rotation speed of the engine substantially constant, the transmission control device switches the gear ratio control mode from the constant engine rotation speed control mode to the constant transmission output shaft torque control mode.

5. The transmission control device according to claim 1, wherein the transmission control device has, as one of the plurality of gear ratio control modes, a constant transmission output shaft torque control mode for decreasing the torque to be output from the electric motor when the electric motor drive permission determining condition being satisfied is no longer satisfied, and wherein, when the transmission control device determines that a voltage of the electric storage device is below a drive permission voltage for the electric motor and sets the constant transmission output shaft torque control mode as the current gear ratio control mode, the calculating the output torque of the engine comprises: increasing the output torque of the engine so as to achieve the driver request torque only by the output torque of the engine while maintaining the best fuel efficiency operation state, the calculating the drive torque of the electric motor comprises: calculating the drive torque of the electric motor so that the electric motor outputs a torque corresponding to a deviation between the output torque of the engine and the driver request torque calculated by the driver request torque calculating device, and the calculating the target gear ratio comprises: controlling the gear ratio so as to achieve the driver request torque only by the output torque of the engine while maintaining the best fuel efficiency operation state at the rotation speed of the engine.

6. The transmission control device according to claim 5, wherein, when the electric motor drive permission determining condition being satisfied is no longer satisfied during control of the gear ratio in a constant engine rotation speed control mode for maintaining the rotation speed of the engine substantially constant, the transmission control device switches the gear ratio control mode from the constant engine rotation speed control mode to the constant transmission output shaft torque control mode.

7. The transmission control device according to claim 1, wherein the transmission control device has, as one of the plurality of gear ratio control modes, a best fuel efficiency control mode for controlling the gear ratio so as to achieve the driver request torque only by the output torque of the engine while maintaining the best fuel efficiency operation state of the engine, and wherein, when the drive permission determining condition is unsatisfied and the driver request torque exceeds a best fuel efficiency torque at a current rotation speed of the engine during control of the gear ratio in a constant engine rotation speed control mode for maintaining the rotation speed of the engine substantially constant, the transmission control device switches the gear ratio control mode from the constant engine rotation speed control mode to the best fuel efficiency control mode.

8. The transmission control device according to claim 1, wherein the calculating the target gear ratio comprises:

storing a calculation expression or a calculation table for calculating the gear ratio for each of the plurality of gear ratio control modes; and changing the calculation expression or the calculation table depending on the current gear ratio control mode, to thereby calculate the gear ratio.

9. The transmission control device according to claim 1, wherein the drive permission determining condition for the electric motor is satisfied when the voltage of the electric storage device is higher than a first threshold, but is unsatisfied when the voltage of the electric storage device is equal to or less than the first threshold.

10. The transmission control device according to claim 1, wherein the drive permission determining condition for the electric motor is satisfied when a temperature of the electric motor is less than a second threshold, but is unsatisfied when the temperature of the electric motor is equal to or higher than the second threshold.

11. The transmission control device according to claim 1, wherein the electric motor comprises a generator motor for applying a torque to the power transmission path by the electric power of the electric storage device, and generating electric power by a torque of the power transmission path to charge the electric storage device.

12. A transmission control method to be used in a vehicle, the vehicle comprising:
    an engine for transmitting power obtained through fuel combustion to a wheel of the vehicle so as to run the vehicle;
    a power transmission path for mutually transmitting the power of the engine and power of the wheel;
    an electric motor for applying a torque to the power transmission path by electric power of an electric storage device;
    a transmission disposed in the power transmission path, for changing a rotation speed of the engine and a rotation speed of the electric motor;
    an engine control device for controlling an output of the engine by adjusting an intake air amount and a fuel injection amount to the engine; and
    a driver request torque calculating device for calculating a driver request torque based on an amount a driver depresses an accelerator pedal,
the transmission control method comprising:
    obtaining the driver request torque;
    calculating a best fuel efficiency torque at a current rotation speed of the engine;
    determining that, based on a drive permission determining condition for the electric motor, the drive of the electric motor is permitted when the drive permission determining condition is satisfied and the drive of the electric motor is prohibited when the drive permission determining condition is unsatisfied;
    selecting one of a plurality of gear ratio control modes depending on a state of the vehicle;
    calculating a drive torque of the electric motor based on a current gear ratio control mode when it is determined that the drive of the electric motor is permitted;
    calculating an output torque of the engine based on the current gear ratio control mode so as to achieve a best fuel efficiency operation state with minimum fuel consumption per unit work amount of the engine; and
    calculating a target gear ratio of the transmission based on the current gear ratio control mode, to thereby control the transmission to achieve the target gear ratio,
wherein the calculating the target gear ratio comprises switching of a method used to calculate the gear ratio based on whether or not the drive of the electric motor is permitted.

* * * * *